United States Patent [19]

Geraghty

[11] Patent Number: 5,424,585
[45] Date of Patent: Jun. 13, 1995

[54] UNIVERSAL AUTOMATIC HEADLIGHT CONTROLLER

[76] Inventor: James M. Geraghty, P.O. Box 1905, Elmira, N.Y. 14902-1905

[21] Appl. No.: 959,423

[22] Filed: Oct. 13, 1992

[51] Int. Cl.[6] .......................... B60L 1/14; B60Q 1/02; H01H 47/24
[52] U.S. Cl. ..................................... 307/10.8; 315/77; 315/83
[58] Field of Search ................. 307/10.1, 10.8, 10.6; 361/160, 166; 318/DIG. 2, 443–445, 484; 054251368/457.2; 315/77, 82, 83

[56] References Cited

U.S. PATENT DOCUMENTS

| | | | |
|---|---|---|---|
| 3,591,845 | 7/1971 | Vanderpoel, Jr. et al. | 307/10.8 |
| 3,702,415 | 11/1972 | Schultz | 315/82 |
| 3,760,236 | 9/1973 | Hollins | 307/10.8 |
| 3,767,966 | 10/1973 | Bell | 315/83 |
| 3,824,405 | 7/1974 | Glaze | 307/10.8 |
| 4,010,380 | 3/1977 | Bailer et al. | 307/10.8 |
| 4,097,839 | 6/1978 | Lesiak | 307/10.8 |
| 4,337,400 | 6/1982 | Hahn | 307/10.8 |
| 4,656,363 | 4/1987 | Carter et al. | 307/10.8 |
| 4,831,310 | 5/1989 | Heintzberger et al. | 315/82 |
| 4,956,562 | 9/1990 | Benedict et al. | 307/10.8 |
| 4,985,660 | 1/1991 | Cronk | 307/10.8 |
| 5,027,001 | 6/1991 | Torbert | 307/10.1 |
| 5,202,581 | 4/1993 | Moore | 307/10.8 |
| 5,250,850 | 10/1993 | Pace et al. | 307/10.8 |

*Primary Examiner*—Marc S. Hoff
*Assistant Examiner*—Richard T. Elms

[57] ABSTRACT

A universally applicable device for automatically turning on a vehicle's exterior lighting and related equipment upon activation of the vehicle's windshield wiper motor, and for keeping them turned on until the vehicle's ignition is turned off, or until the device is turned off by the vehicle's operator; also, for turning on all of a vehicle's exterior lighting and related equipment upon turning on the vehicle's ignition, and for keeping them turned on until the vehicle's ignition is turned off, or until the device is turned off by the vehicle's operator. A function switch is provided to allow the vehicle's operator to select lighting activation in response to the wiper motor, or to the ignition switch; or to turn the device off.

3 Claims, 3 Drawing Sheets

UNIVERSAL AUTOMATIC HEADLIGHT CONTROLLER

BACKGROUND OF THE INVENTION

1. Field of the Invention

The present invention relates in general to a device for automatically controlling vehicle lighting systems, and, more particularly, to a universally applicable device for automatically turning on all of a vehicle's exterior lighting and related equipment upon activation of the vehicle's windshield wiper motor; and turning off said lighting and related equipment upon turning off the vehicle's ignition, or upon deactivation by the vehicle's operator; further to provide means for turning on the vehicle's exterior lighting and related equipment upon turning on the vehicle's ignition, or upon manual activation by the vehicle's operator, and turning off said lighting and related equipment upon turning off the vehicle's ignition, or upon manual deactivation by the vehicle's operator.

2. Prior Art

It has long been recognized that turning on vehicle headlights during reduced visibility conditions in the daytime helps reduce accidents. In a growing number of states and in some foreign countries, law requires use of headlights in such conditions. But while such measures enhance safety, they have the unfortunate side effect of draining batteries when vehicle operators forget to turn the lights off when they leave their vehicles. This presents vehicle operators and law enforcement personnel with a dilemma. As long as there is concern about forgetting to turn their lights off, some operators will leave them off, and risk traffic violations rather than dead batteries.

Reduced visibility specified in such laws includes bad weather conditions, when windshield wipers can be expected to be in use, but also includes situations in which headlight use is required or desired, but windshield wiper use is not, such as smoky or foggy conditions. In addition, many vehicle operators who begin a trip before sunrise and arrive at their destinations in daylight, fail to turn their lights off upon arrival. The operator should be encouraged to use the headlights in such circumstances, assured that they will not be unintentionally left on.

There is a growing need for a universal device which will control headlight systems on all vehicles in all such situations. To be universal in application and acceptance, its design should reflect the fact that responsibility for operating a vehicle rests with its operator, which responsibility should not be usurped. The device should feel natural in use, reducing rather than increasing the operator's burden. It should be adaptable to any vehicle without replacing, modifying, or interfering with the vehicle's original equipment or functions, and it should operate the same way on all vehicles so operators are not confused by it when driving different vehicles. To gain the widest possible acceptance, it should be simple to install.

To meet these requirements, the device should turn the headlights on automatically only when there is a high degree of certainty that headlight use is required or desirable. In the present case, this requirement is met a) when the windshield wiper motor begins to operate, since it is reasonable to assume that the weather conditions requiring wiper use include those in which headlight use is required or desirable, or b) when the operator elects to activate the headlights.

The same principle applies, and for safe operation is more critical, for turning the headlights off. The device should only turn the headlights off when there is a high degree of certainty that they are no longer needed or wanted. This requirement is met in the present case a) when the vehicle's ignition switch is turned off, since it can be reasonably assumed that the operator is discontinuing use of the vehicle when the ignition is turned off, or b) when the operator elects to deactivate the headlights.

There will be times when the vehicle's operator would reasonably choose to override the automatic controls provided by the device. The device must allow the operator to exercise this responsibility.

The need for a control device to operate headlights automatically is pointed out in U.S. Pat. Nos. 3,824,405; 4,010,380; 4,097,839; 4,337,400; 4,656,363; 4,831,310; 4,956,562; 4,985,660; and 5,027,001.

The Glaze U.S. Pat. No. 3,824,405 discloses a device with a modified windshield wiper control switch. It requires replacement of the vehicle's original equipment. On the numerous vehicles with the wiper switch positioned between the wiper motor and ground, the voltage required to trigger the device's relay is not present, and the device will not function properly. It also will not function properly on vehicles with interval wiper systems.

The Bailer et al. U.S. Pat. No. 4,010,380 shows a combined light and windshield wiper switch. It requires replacement of the vehicle's original headlight and wiper switching equipment, and in use would cause increased current flow through the ignition switch. On many vehicles, extensive rewiring would be required to safely accommodate the device.

The Lesiak U.S. Pat. No. 4,097,839 discloses a relay-activated switching device which is not universal because it assumes a directly-grounded wiper motor. On vehicles equipped with the wiper switch between the motor and ground, and there are many, the device would not function properly. On such systems, if the relay were attached on the battery side of the motor, it would be always on. If attached on the ground side of the motor, it would be always off.

The Hahn U.S. Pat. No. 4,337,400 shows a double pole single throw relay activated by a voltage drop across the ignition switch and wiper motor switch. On vehicles equipped with the wiper switch between the wiper motor and ground, the device would not function properly. On many vehicles with interval wiper systems, this device would flash the lights on and off with each pass of the wiper blades, which is undesirable and would shorten headlight life.

The Carter et al. U.S. Pat. No. 4,656,363 shows a device which also assumes a directly-grounded wiper motor. The device would not function properly on vehicles equipped with the wiper switch between the motor and ground. On such systems, if the device were attached on the battery side of the motor, it would be always on. If attached on the ground side of the motor, it would be always off.

The Heintzberger at al. U.S. Pat. No. 4,831,310 discloses a device which uses an AC signal generated when the vehicle's engine is running to determine when to activate the headlight system. This device is not related to activation of the windshield wipers. It has the undesirable effect of turning the lights off whenever the engine stops, which could be unintentional, due to stalling, fuel starvation or any other unintended cause.

The Benedict et al. U.S. Pat. No. 4,956,562 shows a device which operates on the basis of a positive voltage input from the wiper switch. On vehicles with the wiper switch between the wiper motor and ground, wiper switch closure brings the switch to ground, the required positive voltage would not be present with the wiper on, and the device would not operate properly.

The Cronk U.S. Pat. No. 4,985,660 discloses a device which is not universal in that it also assumes a directly-grounded wiper motor. On systems where the wiper switch is between the wiper motor and ground, the required voltage is not available to operate the device's relay, and the device will not function properly. It also has undesirable limitations in that it operates only the headlight low beams and not the high beams, tail lights or other lights and related equipment.

The Torbert U.S. Pat. No. 5,027,001 shows a device for activating a vehicle's wipers and headlights upon sensing of moisture on a vehicle's windshield. This device includes a separate control device which supersedes the vehicle's original wiper motor speed control equipment. It also allows a dangerous situation in which the headlights can unintentionally turn off at night when the headlights had been previously activated by the device in the daytime.

Whatever the merits, features and advantages of the above cited references, none of them achieves or fulfills the purposes of the present invention.

SUMMARY OF THE INVENTION

It is an object of the present invention to provide for automatic activation of all of a vehicle's exterior lighting and related equipment when its windshield wiper motor is activated, providing, at the minimum, all the functions provided by the vehicle's own headlight switching means.

It is an object of this invention to provide for keeping the vehicle's exterior lighting system on after the windshield wiper has been activated, whether or not the windshield wiper remains on.

It is also an object of this invention to provide for automatic shutoff of said lighting and related equipment whenever the vehicle's ignition is shut off.

A further object of this invention is to provide for automatic activation of said lighting and related equipment when the vehicle's ignition is turned on, providing, at the minimum, all the functions provided by the vehicle's own headlight switching means.

An additional object of this invention is to provide for shutoff of said lighting and related equipment by the vehicle's operator while the vehicle's ignition is still on.

Another object of this invention is to provide for more total control of the system by the vehicle's operator, by including a selection means to choose among the aforementioned object functions of this invention, including means to deactivate the present invention.

Still another object of this invention is to provide for more universal application of this invention without dependence on the particular switching means or mechanism or circuitry of a vehicle's windshield wiper system.

Yet another object of this invention is to provide for more universal application of this invention without dependence on the particular switching means or mechanism or circuitry of a vehicle's exterior lighting and related equipment.

An additional object of this invention is to provide for more universal application of this invention without dependence on the particular switching means or mechanism or circuitry of a vehicle's power source.

A further object of this invention is to provide for better maintaining unimpeded operation of all of the functions of which the vehicle was capable prior to installation of this invention.

Another object of this invention is to provide for achieving the aforementioned objects without removing, replacing or modifying any of the vehicle's original wiring and/or equipment.

Still another object of this invention is to provide for easier installation of the device, within the capabilities of those with moderate mechanical aptitude.

Another object of this invention is to provide protective current interruption means to protect the vehicle and the invention from potentially harmful electrical malfunctions.

The foregoing objects can be accomplished as follows. Electrical circuitry is provided for directly detecting the status of a vehicle's windshield wiper motor. Since a voltage drop occurs, if only briefly, across any electric motor in order for the motor to operate, the numerous different switching and control means used for providing this voltage drop on various vehicles are not relevant. Such means are ignored by this invention: it operates independently of all such switching and control means. On vehicles equipped with a pneumatically operated wiper motor, a pneumatically controlled switching means fulfills this wiper motor status detection function. When the wiper motor is detected active, additional circuitry is triggered to activate the exterior lighting system, which comprises headlights, tail lights, dashboard lights, parking lights, headlight retractors, clearance lights and related equipment of the vehicle. This is accomplished by providing switching means in parallel with the vehicle's exterior lighting system switching means, activated by the wiper motor status detection means so as to, at a minimum, duplicate the functions otherwise performed by the vehicle's exterior lighting system switching means. Additional circuitry is provided for detecting the status of the vehicle's ignition system, and additional circuitry is provided for keeping the vehicle's exterior lighting system on until the ignition is detected off by the ignition status detection means, in which case the exterior lighting system is shut off under control of said detection and switching means. Further circuitry and switching means are provided to allow the operator to choose among the aforesaid functions, and to turn the lighting system on or off at will while the vehicle's ignition is on. Because the invention's switching means are electrically in parallel with the vehicle's exterior lighting system switching means, the vehicle's exterior lighting system switching means continue to operate normally when this invention is not active. When the present invention is active, it supplements the functions of the vehicle's exterior lighting system switching means, the vehicle's headlight switch, wiper switch, ignition switch, and devices such as light detecting switching means, moisture sensing switching means and time-delay switching means, will operate in complementary harmony with this invention. Electrical overload protection is achieved by including appropriately placed and rated protective current interruption means in the invention's circuitry, and by attaching the invention to the vehicle in series with the vehicle's protective current interruption means.

DETAILED DESCRIPTION OF THE INVENTION

Figure 1:
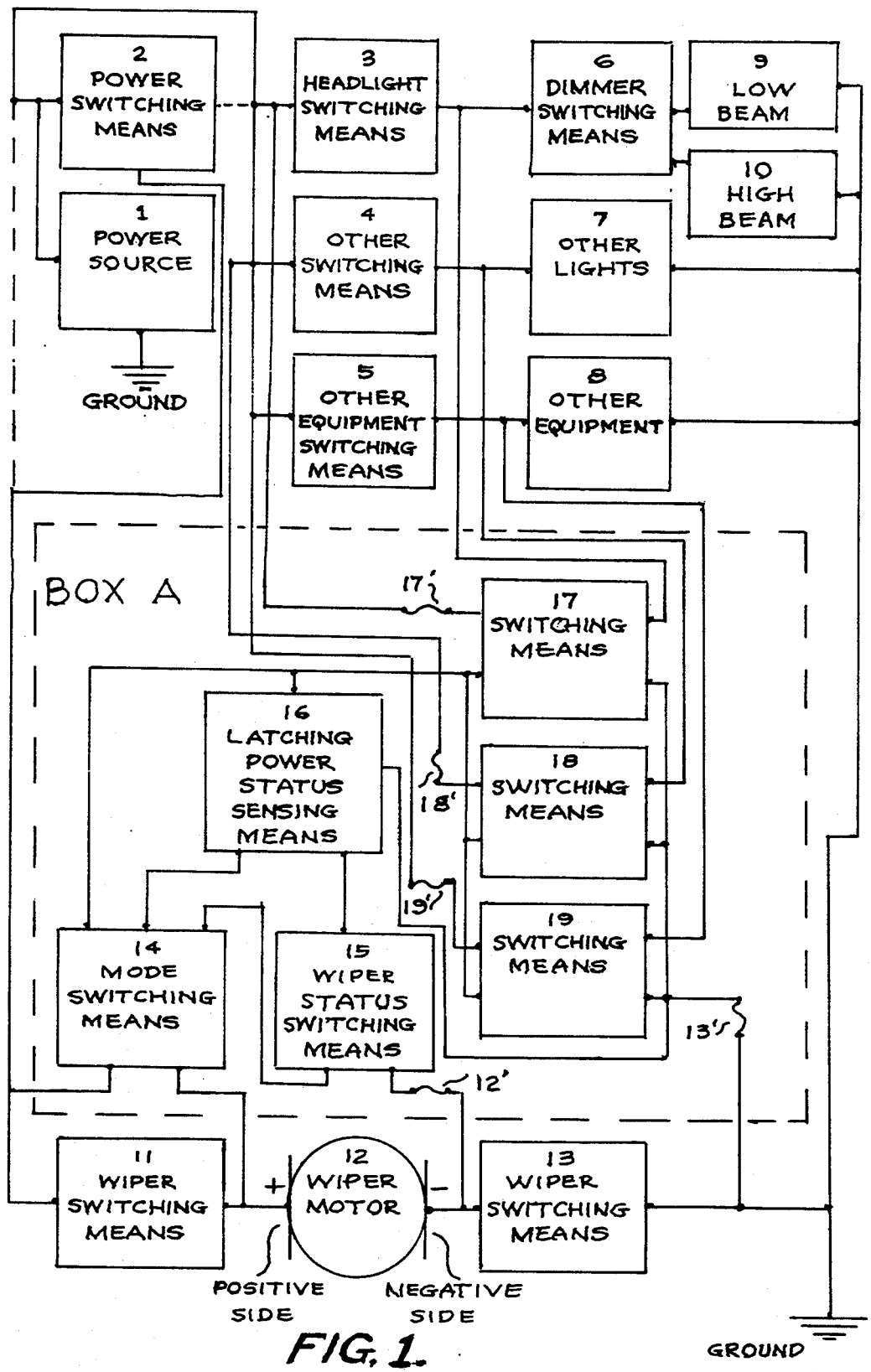
FIG. 1 is a black box circuit diagram of a universal headlight controller made in accordance with this invention.

Referring now to FIG. 1, the circuitry comprising this invention is shown in black box form, enclosed in Box A, along with typical vehicle power, lighting and wiper systems in black box form outside Box A. As shown in FIG. 1, Power Source 1 provides power for the operation of the vehicle's Headlights 9 (Low Beam) and 10 (High Beam) through Headlight Switching Means 3 which may or may not be under control of Power Switching Means 2, and through Dimmer Switching Means 6, which may or may not be integrated into Headlight Switching Means 3. Similarly, power for the operation of tail, parking, and other lights and equipment represented in black box form as Other Lights 7 and Other Equipment 8 is provided under control of Other Switching Means 4 and/or Other Equipment Switching Means 5. Power Source 1 also provides power for operation of Wiper Motor 12, usually but not necessarily through Power Switching Means 2, and through any of numerous possible switching, timing, speed control, and parking means represented in black box form by Wiper Switching Means 11 alone or in combination with Wiper Switching Means 13 represented in black box form, or by Wiper Switching Means 13 alone or in combination with Wiper Switching Means 11 represented in black box form.

The present invention, connected as shown to the vehicle's power, lighting and wiper systems, operates as follows. Under the vehicle operator's control, Mode Switching Means 14 selectively either a) provides a current path to Latching Power Status Sensing Means 16 from Power Source 1 through Power Switching Means 2, and another current path to Wiper Status Sensing Means 15 from the positive side of Wiper Motor 12, or b) provides a current path directly to Switching Means 17 and 18, along with any number of optional Other Switching Means represented at 19, from Power Source 1 through Power Switching Means 2, or c) disengages the circuitry of the present invention from the vehicle, returning all original functions of the vehicle to normal.

With Mode Switching Means 14 set to engage both Latching Power Status Sensing Means 16 and Wiper Status Sensing Means 15 through appropriately rated protective current interruption means 13' and 12', a voltage drop across Wiper Motor 12 sufficient to activate Wiper Motor 12, however briefly and by whatever means, is detected by Wiper Status Sensing Means 15, which activates Latching Power Status Sensing Means 16. When Power Switching Means 2 is closed, current flows through Latching Power Status Sensing Means 16; Switching Means 17, 18 and 19 are activated, and current flows through the vehicle's headlights, tail, parking, other lights, and related equipment 9, 10, 7, and 8, through protective current interruption means 17', 18', and 19' respectively, in parallel with the vehicle's Light Switching Means 3, 4, and 5, activating the vehicle's headlights, tail, parking, other lights, and related equipment 9, 10, 7, and 8. The latching effect of Latching Power Status Sensing Means 16 maintains said current flow until current flow from Power Source 1 is interrupted by opening Power Switching Means 2, Mode Switching Means 14, or both. With Mode Switching Means 14 in this position, the vehicle's headlights, tail, parking, other lights, and related equipment 9, 10, 7, and 8 are activated when Wiper Motor 12 is activated, and the latching effect of Latching Power Status Sensing Means 16 keeps the vehicle's headlights, tail, parking, other lights, and related equipment 9, 10, 7, and 8 turned on regardless of the subsequent status of Wiper Motor 12, until the vehicle operator turns off Power Switching Means 2, or Mode Switching Means 14, or both. On vehicles equipped with a pneumatically controlled wiper motor, a pneumatically controlled switching means is connected to said pneumatically controlled motor and electrically interposed between Power Switching Means 2 and Mode Switching Means 14 to provide current to Wiper Status Sensing Means 15.

With Mode Switching Means 14 positioned so as to provide a current path directly to Switching Means 17, 18, and 19, current flows through Switching Means 17, 18 and 19 whenever Power Switching Means 2 is closed; Switching Means 17, 18 and 19 are activated, and current flows through the vehicle's headlights, tail, parking, other lights, and related equipment 9, 10, 7, and 8, through protective current interruption means 17', 18', and 19' respectively, in parallel with the vehicle's Light Switching Means 3, 4, and 5, activating the vehicle's headlights, tail, parking, other lights, and related equipment 9, 10, 7, and 8. The lighting system remains activated until the vehicle operator turns off Switching Means 2, or Mode Switching Means 14, or both. With Mode Switching Means 14 set in this position, the vehicle's headlights, tail, parking, other lights, and related equipment 9, 10, 7, and 8 are on whenever Power Switching Means 2 is closed.

With Mode Switching Means 14 disengaged, the present invention is turned off and all original functions of the vehicle return to normal.

Figure 2:
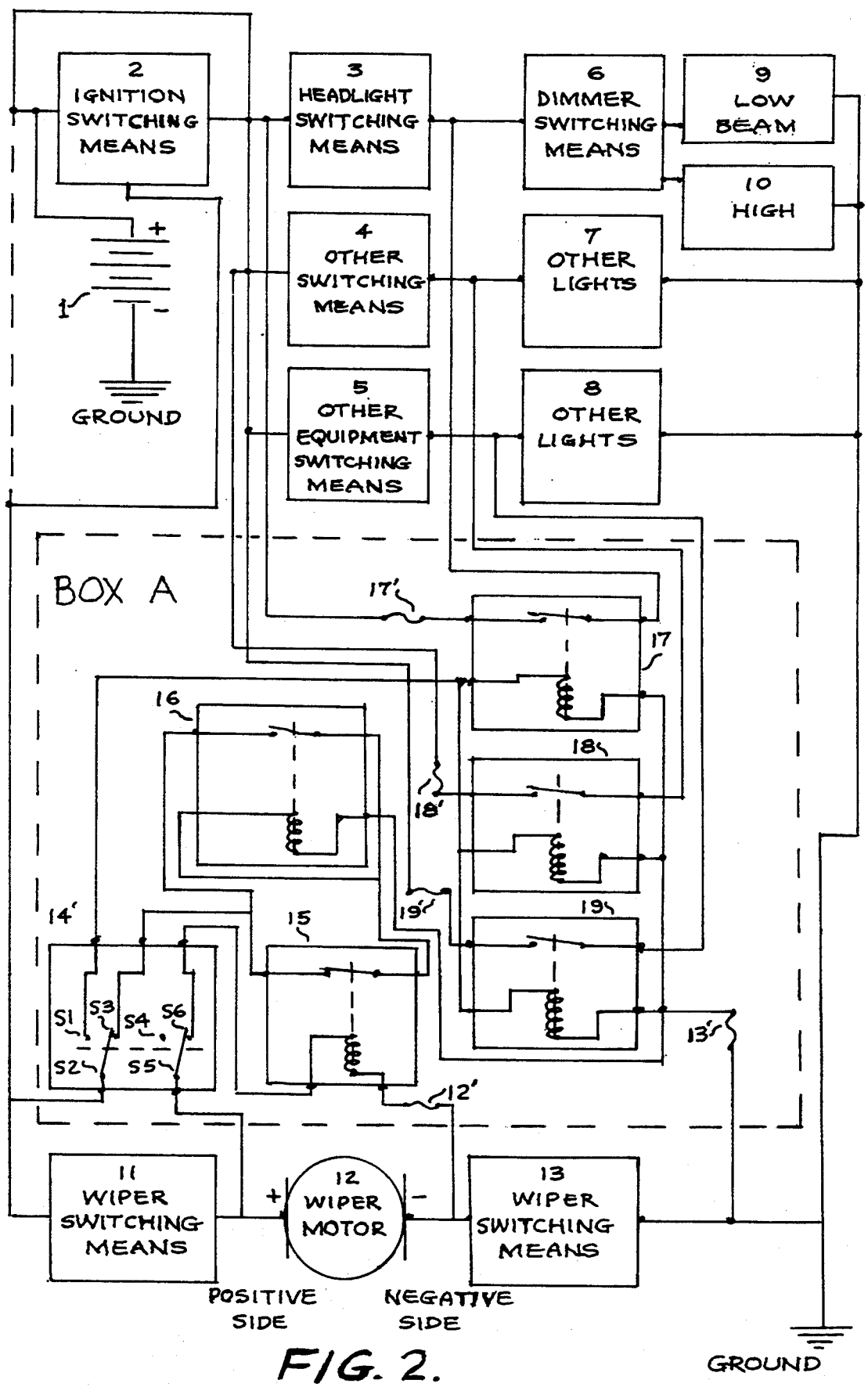
FIG. 2 is a schematic circuit diagram of first embodiment of a universal headlight controller made in accordance with this invention.

Referring now to FIG. 2, the circuitry comprising this invention is shown in schematic form, enclosed in Box A, along with typical vehicle power, lighting and wiper systems in black box form outside Box A. As shown in FIG. 2, Battery 1 provides power for the operation of the vehicle's Headlights 9 (Low Beam) and 10 (High Beam) through Headlight Switching Means 3 shown in black box form, which may or may not be under control of Ignition Switching Means 2, and through Dimmer Switching Means 6 shown in black box form, which may or may not be integrated into Headlight Switching Means 3. Similarly, power for the operation of tail, parking, and other lights and equipment represented in black box form as Other Lights 7 and Other Equipment 8 is provided under control of Other Switching Means 4 and/or Other Equipment Switching Means 5, both shown in black box form. Battery 1 also provides power for operation of Wiper Motor 12, usually but not necessarily through Ignition Switching Means 2, and through any of numerous possible switching, timing, speed control, and parking means represented in black box form by Wiper Switching Means 11 alone or in combination with Wiper Switching Means 13 represented in black box form, or by Wiper Switching Means 13 alone or in combination with Wiper Switching Means 11 represented in black box form.

The present invention, connected as shown to the vehicle's lighting and wiper systems, operates as follows. Under the vehicle operator's control, Double Pole Double Throw Mode Switching Means 14 selectively either a) provides a current path through contacts S2–S3 to the contacts of Ignition Status Sensing Relay 16, and another current path through contacts S5–S6 to the coil of Wiper Status Sensing Relay 15; or b) provides a current path directly through contacts S1–S2, to the coils of Relays 17 and 18, along with any number of optional relays symbolically represented as single Relay 19; or c) disengages the circuitry of the present invention from the vehicle, returning all original functions of the vehicle to normal.

With Mode Switching Means 14 set to engage both Ignition Status Sensing Relay 16 and Wiper Status Sensing Relay 15, a voltage drop across Wiper Motor 12 sufficient to activate Wiper Motor 12, however briefly and by whatever means, causes current flow through the coil of Wiper Status Sensing Relay 15, closing the normally open contacts of Wiper Status Sensing Relay 15. This provides a current path through the contacts of Wiper Status Sensing Relay 15, to the coil of Ignition Status Sensing Relay 16. When Ignition Switching Means 2 is closed, current flows through the contacts of Wiper Status Sensing Relay 15, through the coil of Ignition Status Sensing Relay 16, and through the coils of Relays 17, 18 and 19, through protective current interruption means 13', to Ground. The normally open contacts of Relays 17, 18, and 19 close, and current then flows through the contacts of Relays 17, 18 and 19, through the vehicle's headlights, tail, parking, other lights, and related equipment 9, 10, 7, and 8, through protective current interruption means 17', 18', 19' respectively, in parallel with the vehicle's Light Switching Means 3, 4, and 5, activating the vehicle's headlights, tail, parking, other lights, and related equipment 9, 10, 7, and 8. Current also flows through the closed contacts of Status Sensing Relay 16 through its own coil, which latches Status Sensing Relay 16 closed, and maintains said current flow until current flow from Battery 1 is interrupted by opening Ignition Switching Means 2, Mode Switching Means 14, or both. With Mode Switching Means 14 in this position, the vehicle's headlights, tail, parking, other lights, and related equipment 9, 10, 7, and 8 are activated when Wiper Motor 12 is activated, and the latching effect of Ignition Status Sensing Relay 16 keeps the vehicle's headlights, tail, parking, other lights, and related equipment 9, 10, 7, and 8 turned on regardless of the subsequent status of Wiper Motor 12, until the vehicle operator turns off Ignition Switching Means 2, or Mode Switching Means 14, or both. On vehicles equipped with a pneumatically controlled wiper motor, a pneumatically controlled switching means is connected to said pneumatically controlled motor and electrically interposed between Ignition Switching Means 2 and Mode Switching Means 14 to provide current to Wiper Status Sensing Relay 15.

With Mode Switching Means 14 positioned so as to provide a current path directly to the coils of Relays 17, 18, and 19, current flows through the coils of Relays 17, 18 and 19 whenever Ignition Switching Means 2 is closed, closing the normally open contacts of Relays 17, 18, and 19. Current then flows through the contacts of Relays 17, 18 and 19, through the vehicle's headlights, tail, parking, other lights, and related equipment 9, 10, 7, and 8, through protective current interruption means 17', 18', 19' respectively, in parallel with the vehicle's Light Switching Means 2, activating the vehicle's headlights, tail, parking, other lights, and related equipment 9, 10, 7, and 8. The lighting system remains activated until the vehicle operator turns off Ignition Switching Means 2, or Mode Switching Means 14, or both. With Mode Switching Means 14 set in this position, the vehicle's headlights, tail, parking, other lights, and related equipment 9, 10, 7, and 8 are on whenever Ignition Switching Means 2 is closed.

With Mode Switching Means 14 disengaged, the present invention is turned off and all original functions of the vehicle return to normal.

Figure 3:
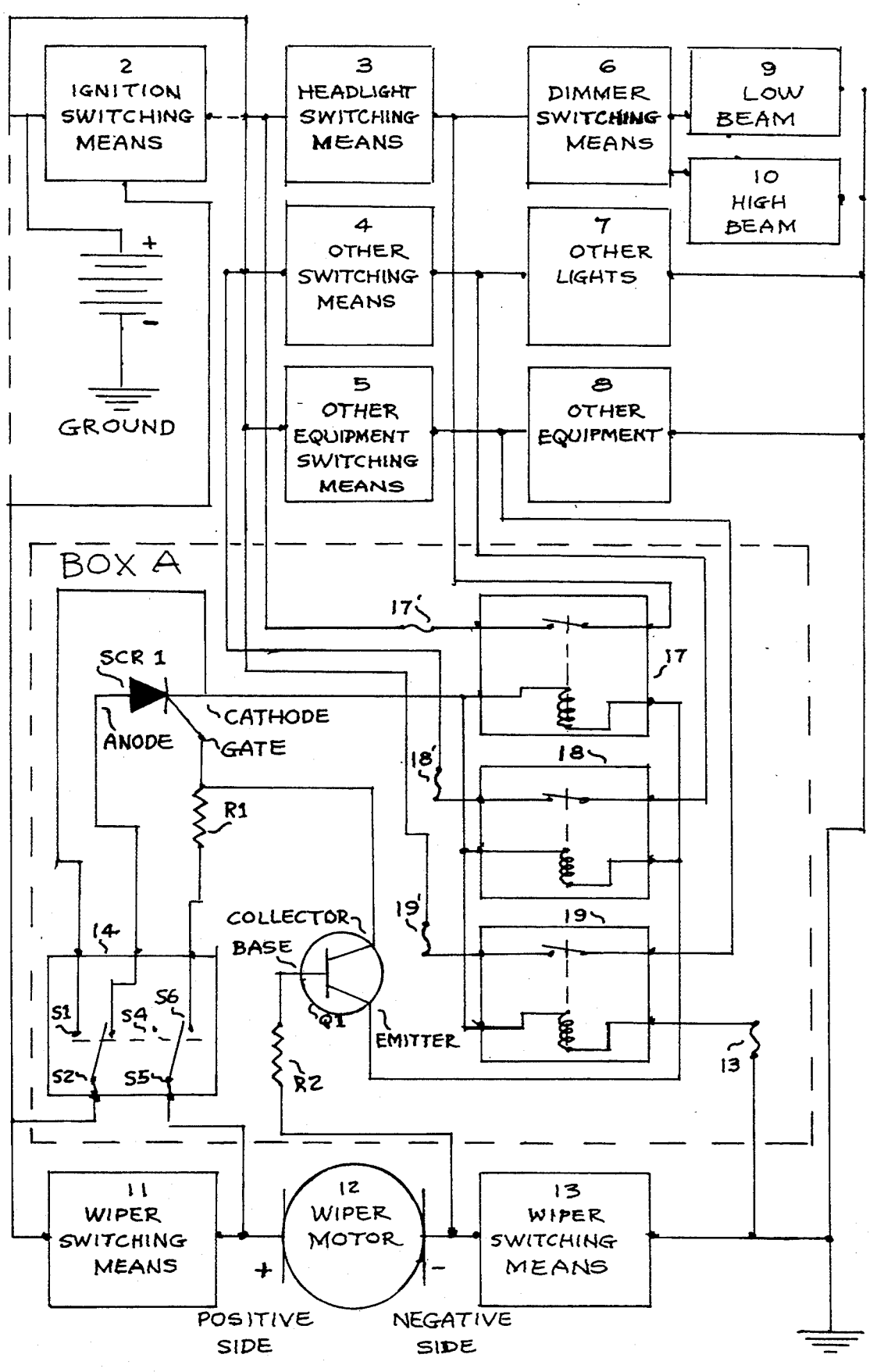
FIG. 3 is a schematic circuit diagram of a second embodiment of a universal headlight controller made in accordance with this invention.

Referring now to FIG. 3, the circuitry comprising this invention is shown in schematic form, enclosed in Box A, along with typical vehicle power, lighting and wiper systems in black box form outside Box A. As shown in FIG. 3, Battery 1 provides power for the operation of the vehicle's Headlights 9 (Low Beam) and 10 (High Beam) through Headlight Switching Means 3 shown in black box form, which may or may not be under control of Ignition Switching Means 2, and through Dimmer Switching Means 6 shown in black box form, which may or may not be integrated into Headlight Switching Means 3. Similarly, power for the operation of tail, parking, and other lights and equipment represented in black box form as Other Lights 7 and Other Equipment 8 is provided under control of Other Switching Means 4 and/or Other Equipment Switching Means 5, both shown in black box form. Battery 1 also provides power for operation of Wiper Motor 12, usually but not necessarily through Ignition Switching Means 2, and through any of numerous possible switching, timing, speed control, and parking means represented in black box form by Wiper Switching Means 11 alone or in combination with Wiper Switching Means 13 represented in black box form, or by Wiper Switching Means 13 alone or in combination with Wiper Switching Means 11 represented in black box form.

The present invention, connected as shown to the vehicle's lighting and wiper systems, operates as follows. Under the vehicle operator's control, Double Pole Double Throw Mode Switching Means 14 selectively either a) provides a current path through contacts S2–S3 to the Anode of Silicon Controlled Rectifier SC1, and another current path through contacts S5–S6, through Resistor R1 to the Gate of Silicon Controlled Rectifier SC1 and to the Collector of NPN Transistor Q1; or b) provides a current path directly through contacts S1–S2, to the coils of Relays 17, and 18, along with any number of optional relays symbolically represented as single Relay 19; or c) disengages the circuitry of the present invention from the vehicle, returning all original functions of the vehicle to normal.

With the Double Pole Double Throw Mode Switching Means 14 positioned so as to close contacts S2–S3 and S5–S6, a current path is provided through Ignition Switching Means 2, through contacts S2–S3, through Silicon Controlled Rectifier SC1, through the coils of Relays 17, 18 and 19, through protective current interruption means 13' to Ground. Also, two current paths are provided from the positive side of Wiper Motor 12, one through Resistor R1 to the Gate of Silicon Controlled Rectifier SC1, the other through Resistor R1, through the Collector and Emitter of NPN Transistor Q1, through protective current interruption means 13' to Ground. The circuitry comprising Transistor Q1 and Resistor R2 provides for wiper systems incorporating a Switching Means 13 between the Wiper Motor 12 and Ground. On such systems, the current path from the positive side of said wiper motor through said Silicon Controlled Rectifier through Relays 17, 18 and 19 to Ground would otherwise trigger SC1 whenever Ignition Switching Means 2 is closed, whether or not Switching Means 13 is closed. To prevent this, Transistor Q1 operates as a logical NOT circuit across Switching Means 13, providing a shunt from Resistor R1 to Ground whenever Switching Means 13 is open. When Switching Means 13 is open, and current flows through Resistor R1, a very small Base current flows through Wiper Motor 12 and triggers Q1, providing a low-impedance current path from R1, through protective current interruption means 13' to Ground, shunting current away from the Gate of SC1. When Switching Means 13 is closed, current is shunted away from the Base of Q1, the Collector-Emitter path of Q1 becomes high impedance, and a trigger current path is provided through the Gate of SC1. On wiper systems without a Switching Means 13, the Base of Transistor Q1 is always at Ground and Q1 serves no function. Thus, on any type of Wiper System, when Ignition Switching Means 2 is closed, and only when current has begun to flow through Wiper Motor 12, even briefly as in the case of some interval wiper systems, the Gate of SC1 is triggered and current flows through the Silicon Controlled Rectifier SC1, through the coils of Relays 17, 18, and 19, through protective current interruption means 13' to Ground. The normally open contacts of Relays 17, 18, and 19 close, and current then flows through the contacts of Relays 17, 18, and 19, through the vehicle's headlights, tail, parking, other lights, and related equipment 9, 10, 7, and 8, through protective current interruption means 17', 18', and 19' respectively, in parallel with the vehicle's Light Switching Means 3, 4, and 5, activating the vehicle's headlights, tail, parking, other lights, and related equipment 9, 10, 7, and 8. The latching effect of Silicon Controlled Rectifier SC1 maintains said current flow until current flow from Battery 1 is interrupted by opening Ignition Switching Means 2, Mode Switching Means 14, or both. With Mode Switching Means 14 in this position, the vehicle's headlights, tail, parking, other lights, and related equipment 9, 10, 7, and 8 are activated when Wiper Motor 12 is activated, and the latching effect of Silicon Controlled Rectifier SC1 keeps the vehicle's headlights, tail, parking, other lights, and related equipment 9, 10, 7, and 8 turned on regardless of the subsequent status of Wiper Motor 12, until the vehicle operator turns off Ignition Switching Means 2, or Mode Switching Means 14, or both. On vehicles equipped with a pneumatically controlled wiper motor, a pneumatically controlled switching means is connected to said pneumatically controlled wiper motor and electrically interposed between Ignition Switching Means 2 and Mode Switching Means 14 to provide current to Silicon Controlled Rectifier SC1 through Resistor R1. With Mode Switching Means 14 positioned so as to provide a current path directly to the coils of Relays 17, 18, and 19, current flows through the coils of Relays 17, 18 and 19 whenever Ignition Switching Means 2 is closed, closing the normally open contacts of Relays 17, 18, and 19. Current then flows through the contacts of Relays 17, 18 and 19, through the vehicle's headlights, tail, parking, other lights, and related equipment 9, 10, 7, and 8, through protective current interruption means 17', 18', and 19' respectively, in parallel with the vehicle's Light Switching Means 3, 4 and 5, activating the vehicle's headlights, tail, parking, other lights and related equipment 9, 10, 7, and 8. The lighting system remains activated until the vehicle operator turns off Ignition Switching Means 2, or Mode Switching Means 14, or both. With Mode Switching Means 14 set in this position, the vehicle's headlights, tail, parking, other lights, and related equipment 9, 10, 7, and 8 will be on whenever Ignition Switching Means 2 is closed.

With Mode Switching Means 14 disengaged, the present invention is turned off and all original functions of the vehicle return to normal.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall in the true spirit and scope of the invention.

I claim:

1. A universally applicable circuit for automatically turning on a vehicle's exterior lighting and related equipment upon activation of the vehicle's power source and windshield wiper motor, without reliance on the design of the particular switching means of the vehicle's power source, and without reliance on the design of the particular switching means of the vehicle's windshield wiper system, and without reliance on the design of the particular switching means of the vehicle's exterior lighting and related equipment; for keeping said lighting and related equipment turned on until turned off as hereinafter described; for turning off said lighting and related equipment upon turning off the vehicle's power switching means; and alternatively, for turning off said lighting and related equipment by the vehicle's operator; additionally, for turning on the vehicle's exterior lighting and related equipment upon closing the vehicle's power switching means; for keeping said lighting and related equipment turned on until turned off as hereinafter described, for turning off said lighting and related equipment upon opening the vehicle's power switching means; and alternatively, for turning off said lighting and related equipment by the vehicle's operator; said device comprising:

typical vehicle power, lighting and wiper systems, comprising:
an electrical power source and power switching means; headlights, tail, parking, and other lights and related equipment; switching means for controlling said headlights, tail, parking, and other lights and related equipment; a windshield wiper motor; switching means for controlling said windshield wiper motor;
an operator-controllable switching means electrically connected to said power switching means, and to said windshield wiper motor, which selectively provides a) a current path to a latching power status sensing means from said power source through said power switching means, and another current path to a wiper status sensing means from the positive side of said wiper motor, or b) a current path directly to the switching means which control the headlights, tail, parking, and other lights and related equipment;

c) an off position, breaking the current paths described in a) and b), above;

said wiper status sensing means to detect a voltage drop across said wiper motor sufficient to activate said wiper motor, however briefly and however caused, said wiper status sensing means being electrically connected through said operator-controllable switching means to the positive side of said wiper motor and directly to the negative side of said wiper motor through appropriately rated protective current interruption means; which activates said latching power status sensing means electrically connected to said operator-controllable switching means and to said wiper status sensing means, which causes current flow to said switching means which control the headlights, tail, parking, and other lights and related equipment, in response to said operator-controllable switching means and said wiper status sensing means;

said switching means which operate the vehicle's headlights, tail, parking, other lights, and related equipment in parallel with the vehicle's headlight, tail, parking, other lights, and related equipment switching means, through appropriately rated protective current interruption means and in response to said operator-controllable switching means, wiper status sensing means, and latching power status sensing means.

2. A universally-applicable circuit for automatically turning on a vehicle's exterior lighting and related equipment upon activation of the vehicle's power source and windshield wiper motor, without reliance on the design of the particular switching means of the vehicle's power source, and without reliance on the design of the particular switching means of the vehicle's windshield wiper system, and without reliance on the design of the particular switching means of the vehicle's exterior lighting and related equipment; for keeping said lighting and related equipment turned on until turned off as hereinafter described; for turning off said lighting and related equipment upon turning off the vehicle's power switching means; and alternatively, for turning off said lighting and related equipment by the vehicle's operator; additionally, for turning on the vehicle's exterior lighting and related equipment upon closing the vehicle's power switching means; for keeping said lighting and related equipment turned on until turned off as hereinafter described; for turning off said lighting and related equipment upon opening the vehicle's power switching means; and alternatively, for turning off said lighting and related equipment by the vehicle's operator; said device comprising:

typical vehicle's power, lighting and wiper systems, comprising:

a typical vehicle battery; an ignition switching means; headlights, tail, parking, and other lights and related equipment; switching means for controlling said headlights, tail, parking, and other lights and related equipment; a windshield wiper motor; switching means for controlling said windshield wiper motor;

an operator-controllable switching means comprising a double pole double throw switching means electrically connected to said ignition switching means, and to said windshield wiper motor, which selectively provides a) a current path to a first normally open relay switching means from the positive side of said wiper motor, and another current path to a second normally open relay switching means from said battery through said ignition switching means, or b) a current path directly to relay switching means which control the headlights, tail, parking, and other lights and related equipment through appropriately rated protective current interruption means;

c) an off position, breaking the current paths described in a) and b), above;

said first normally open relay switching means, electrically connected through said operator-controllable switching means to the positive side of said wiper motor and directly to the negative side of said wiper motor through appropriately rated protective current interruption means, which activates said second normally open relay switching means, electrically connected to said operator-controllable switching means and to said first normally open relay switching means, which causes current flow to the said relay switching means which control the headlight, tail, parking, and other lights and related equipment, in response to said operator-controllable switching means and said wiper status sensing means;

said relay switching means which operate the vehicle's headlights, tail, parking, other lights, and related equipment in parallel with the vehicle's headlight, tail, parking, other lights, and related equipment switching means, through appropriately rated protective current interruption means and in response to said operator-controllable switching means, said first normally open relay switching means, and said second normally open relay switching means.

3. A universally applicable circuit for automatically turning on a vehicle's exterior lighting and related equipment upon activation of the vehicle's power source and windshield wiper motor, without reliance on the design of the particular switching means of the vehicle's power source, and without reliance on the design of the particular switching means of the vehicle's windshield wiper system, and without reliance on the design of the particular switching means of the vehicle's exterior lighting and related equipment; for keeping said lighting and related equipment turned on until turned off as hereinafter described; for turning off said lighting and related equipment upon turning off the vehicle's power switching means; and alternatively, for turning off said lighting and related equipment by the vehicle's operator; additionally, for turning on the vehicle's exterior lighting and related equipment upon closing the vehicle's power switching means; for keeping said lighting and related equipment turned on until turned off as hereinafter described; for turning off said lighting and related equipment upon opening the vehicle's power switching means; and alternatively, for turning off said lighting and related equipment by the vehicle's operator; said device comprising:

typical vehicle power, lighting and wiper systems, comprising:

a typical vehicle battery; an ignition switching means; headlights, tail, parking, and other lights and related equipment; switching means for controlling said headlights, tail, parking, and other lights and related equipment; a windshield wiper motor; switching means for controlling said windshield wiper motor;

an operator-controllable switching means comprising a double pole double throw switching means electrically connected to said ignition switching means, and to said windshield wiper motor, which selectively provides a) a current path to the anode of a silicon controlled rectifier from said battery through said ignition switching means, and another current path through a first resistor to the gate of said silicon controlled rectifier from the positive side of said wiper motor, or b) a current path directly to relay switching means which control the headlights, tail, parking, and other lights and related equipment through appropriately rated protective current interruption means;

c) an off position, breaking the current paths described in a) and b), above;

said silicon controlled rectifier, electrically connected through said operator-controllable switching means to the positive side of said wiper motor and to the negative side of said wiper motor through the collector and base of an NPN transistor through a second resistor, the cathode of said silicon controlled rectifier being electrically connected to said relay switching means which control the headlights, tail, parking, and other lights and related equipment;

said relay switching means which operate the vehicle's headlights, tail, parking, other lights, and related equipment in parallel with the vehicle's headlight, tail, parking, other lights, and related equipment switching means, through appropriately rated protective current interruption means in response to said operator-controllable switching means, and said silicon controlled rectifier;

said NPN transistor, the base of which is electrically connected through said second resistor to the negative side of said wiper motor, the collector of which is electrically connected to said first resistor, and the emitter of which is electrically connected to said relay switching means which operate the vehicle's headlights, tail, parking, other lights, and related equipment, and through appropriately rated protective current interruption means to ground; said transistor operating to provide for wiper systems incorporating a switching means between said wiper motor and ground, in which the current path from the positive side of said wiper motor through said silicon controlled rectifier through said relay switching means which operate the vehicle's headlights, tail, parking, other lights, and related equipment to ground would otherwise trigger said silicon controlled rectifier whenever said ignition switching means is closed, whether or not said switching means between said wiper motor and ground is closed, said transistor operating as a logical NOT circuit across said switching means between said wiper motor and ground.

* * * * *